(12) United States Patent
Gurman

(10) Patent No.: US 9,235,753 B2
(45) Date of Patent: Jan. 12, 2016

(54) EXTRACTION OF SKELETONS FROM 3D MAPS

(71) Applicant: PRIMESENSE LTD., Tel Aviv (IL)

(72) Inventor: Amiad Gurman, D.N. Efrayim (IL)

(73) Assignee: APPLE INC., Cupertino, CA (US)

( * ) Notice: Subject to any disclaimer, the term of this patent is extended or adjusted under 35 U.S.C. 154(b) by 236 days.

(21) Appl. No.: 14/020,851

(22) Filed: Sep. 8, 2013

(65) Prior Publication Data

US 2014/0010425 A1 Jan. 9, 2014

Related U.S. Application Data

(63) Continuation of application No. 12/854,188, filed on Aug. 11, 2010, now Pat. No. 8,565,479.

(60) Provisional application No. 61/233,502, filed on Aug. 13, 2009.

(51) Int. Cl.
  *G06K 9/00* (2006.01)
  *G06T 7/20* (2006.01)
  *G06T 7/60* (2006.01)

(52) U.S. Cl.
  CPC ........ *G06K 9/00362* (2013.01); *G06K 9/00201* (2013.01); *G06K 9/00342* (2013.01); *G06K 9/00369* (2013.01); *G06T 7/2046* (2013.01); *G06T 7/602* (2013.01); *G06T 2207/10028* (2013.01); *G06T 2207/30172* (2013.01); *G06T 2207/30196* (2013.01)

(58) Field of Classification Search
  CPC .......... G06K 9/00362; G06K 9/00201; G06K 9/00342; G06K 9/00369; A61K 9/0021; A61M 2037/0023; A61M 2037/0046; A61M 2037/0061; A61M 37/0015; G06T 2207/10028; G06T 2207/30172; G06T 2207/30196; G06T 7/2046; G06T 7/602
  See application file for complete search history.

(56) References Cited

U.S. PATENT DOCUMENTS 6,771,818 B1    8/2004   Krumm et al.
7,068,815 B2    6/2006   Chang et al.
(Continued)

FOREIGN PATENT DOCUMENTS

JP    2006146846 A    6/2006
WO   2006083567 A1    8/2006

OTHER PUBLICATIONS

U.S. Appl. No. 13/867,083 Office Action dated Oct. 23, 2013.
(Continued)

*Primary Examiner* — Tom Y Lu
(74) *Attorney, Agent, or Firm* — D. Kligler I.P. Services Ltd

(57) ABSTRACT

A method for processing data includes receiving a temporal sequence of depth maps of a scene containing a humanoid form having a head. The depth maps include a matrix of pixels having respective pixel depth values. A digital processor processes at least one of the depth maps so as to find a location of the head and estimates dimensions of the humanoid form based on the location. The processor tracks movements of the humanoid form over the sequence using the estimated dimensions.

20 Claims, 3 Drawing Sheets

(56) References Cited

U.S. PATENT DOCUMENTS

| | | |
|---|---|---|
| 7,317,830 B1 | 1/2008 | Gordon et al. |
| 7,573,480 B2 | 8/2009 | Gordon |
| 7,706,571 B2 | 4/2010 | Das et al. |
| 7,974,443 B2 * | 7/2011 | Kipman et al. ............... 382/103 |
| 7,987,021 B2 | 7/2011 | Takaoka |
| 8,175,374 B2 | 5/2012 | Pinault et al. |
| 8,280,165 B2 | 10/2012 | Meng et al. |
| 8,320,621 B2 | 11/2012 | McEldowney |
| 8,358,342 B2 | 1/2013 | Park |
| 8,405,656 B2 | 3/2013 | El Dokor et al. |
| 8,411,149 B2 | 4/2013 | Maison et al. |
| 8,503,720 B2 | 8/2013 | Shotton et al. |
| 2003/0113018 A1 | 6/2003 | Nefian et al. |
| 2007/0003141 A1 | 1/2007 | Rittscher et al. |
| 2007/0086621 A1 | 4/2007 | Aggarwal et al. |
| 2007/0126921 A1 | 6/2007 | Gallagher et al. |
| 2008/0310706 A1 | 12/2008 | Asatani et al. |
| 2009/0035695 A1 | 2/2009 | Campestrini et al. |
| 2009/0222388 A1 | 9/2009 | Hua et al. |
| 2010/0302395 A1 | 12/2010 | Mathe et al. |
| 2010/0303289 A1 | 12/2010 | Polzin et al. |
| 2010/0322515 A1 | 12/2010 | Cheng |
| 2011/0025689 A1 | 2/2011 | Perez et al. |
| 2011/0102438 A1 | 5/2011 | Mathe et al. |
| 2011/0175984 A1 | 7/2011 | Tolstaya et al. |
| 2011/0293137 A1 | 12/2011 | Gurman et al. |
| 2012/0087572 A1 | 4/2012 | Dedeoglu et al. |
| 2012/0162065 A1 | 6/2012 | Tossell et al. |

OTHER PUBLICATIONS

U.S. Appl. No. 13/867,085 Office Action dated Nov. 7, 2013.

Krumm et al., "Multi-camera multi person tracking for EasyLiving"., Visual surveillance, 2000, Proceedings, Third International workshop pp. 1-8, 2000.

Yous et al., "People detection and tracking with World-Z map from single stereo camera".,Visual surveillance, 2008, Eighth International workshop , pp. 1-8, 2008.

Damen et al., "Detecting carried objects in short video sequences", ECCV , School of computing, University of Leeds, pp. 1-14, 2008.

Ran et al., "Multi moving people detection from binocular sequences", Center for Automation Research Institute of Advanced Computer Studies, University of Maryland, pp. 1-4, 2003.

Balcells et al., "An appearance-based approach for consistent labeling of humans and objects in video", Pattern Analysis and Application, pp. 373-385, 2004.

Cucchiara et al., "Track-based and object-based occlusion for people tracking refinement indoor surveillance", VSSN, pp. 1-7, 2004.

Ess et al., "Improved multi-person tracking with active occlusion handling", ICRA workshop of people Detection and tracking, pp. 1-6, 2009.

Japanese patent application # 201176786 Office Action dated Apr. 16, 2014.

U.S. Appl. No. 13/461,802 Office Action dated Aug. 8, 2014.

U.S. Appl. No. 14/341,807 Office Action dated Dec. 9, 2014.

U.S. Appl. No. 14/341,807 Office Action dated Apr. 22, 2015.

* cited by examiner

EXTRACTION OF SKELETONS FROM 3D MAPS

CROSS-REFERENCE TO RELATED APPLICATION

This application is a continuation of U.S. patent application Ser. No. 12/854,188, filed Aug. 11, 2010, which claims the benefit of U.S. Provisional Patent Application 61/233,502, filed Aug. 13, 2009, which is incorporated herein by reference.

FIELD OF THE INVENTION

The present invention relates generally to methods and systems for three-dimensional (3D) mapping, and specifically to processing of 3D map data.

BACKGROUND OF THE INVENTION

A number of different methods and systems are known in the art for creating depth maps. In the present patent application and in the claims, the term "depth map" refers to representation of a scene as a two-dimensional matrix of pixels, in which each pixel corresponds to a respective location in the scene and has a respective pixel depth value, indicative of the distance from certain reference location to the respective scene location. (In other words, the depth map has the form of an image in which the pixel values indicate topographical information, rather than brightness and/or color of the objects in the scene.) Depth maps may be created, for example, by detection and processing of an image of an object onto which a laser speckle pattern is projected, as described in PCT International Publication WO 2007/043036 A1, whose disclosure is incorporated herein by reference.

Depth maps may be processed in order to segment and identify objects in the scene. Identification of humanoid forms (meaning 3D shapes whose structure resembles that of a human being) in a depth map, and changes in these forms from scene to scene, may be used as a means for controlling computer applications. For example, PCT International Publication WO 2007/132451, whose disclosure is incorporated herein by reference, describes a computer-implemented method in which a depth map is segmented so as to find a contour of a humanoid body. The contour is processed in order to identify a torso and one or more limbs of the body. An input is generated to control an application program running on a computer by analyzing a disposition of at least one of the identified limbs in the depth map.

SUMMARY OF THE INVENTION

Embodiments of the present invention provide methods, devices and software for extracting information from depth maps.

There is therefore provided, in accordance with an embodiment of the present invention, a method for processing data, including receiving a temporal sequence of depth maps of a scene containing a humanoid form having a head, the depth maps including a matrix of pixels having respective pixel depth values. Using a digital processor, at least one of the depth maps are processed so as to find a location of the head. Dimensions of the humanoid form are estimated based on the location, and movements of the humanoid form are tracked over the sequence using the estimated dimensions.

In some embodiments, estimating the dimension includes extracting a height of the humanoid form from the at least one of the depth maps based on the location of the head. Extracting the height may include locating a foot of the humanoid form in the at least one of the depth maps, and measuring a distance from the head to the foot. Alternatively, extracting the height includes processing the at least one of the depth maps so as to identify a planar surface corresponding to a floor on which the humanoid form is standing, and measuring a distance from the head to the planar surface.

In disclosed embodiments, processing the at least one of the depth maps includes identifying left and right arms of the humanoid form, and searching to find the head between the arms. In one embodiment, identifying the left and right arms includes capturing the at least of the depth maps while the humanoid form stands in a calibration pose, in which the left and right arms are raised. Typically, the left and right arms are raised above a shoulder level of the humanoid form in the calibration pose.

Additionally or alternatively, identifying the left and right arms includes extracting edges of the humanoid form from the at least one depth map, finding three-dimensional (3D) medial axes and extreme points of limbs of the humanoid form based on the edges, and identifying joints in the limbs based on the medial axes. Typically, identifying the joints includes locating left and right shoulders of the humanoid form, and estimating the dimensions includes extracting a height of the humanoid form from the at least one of the depth maps based on the location of the head, and computing a width between the shoulders, and estimating the dimensions of other parts of the humanoid form using the height and the width.

In an alternative embodiment, the method includes capturing one or more two-dimensional (2D) images of the humanoid form, and detecting a face of the humanoid form in the 2D images, wherein processing the at least one of the depth maps includes registering the depth maps with the 2D images, and finding the location of the head using the detected face.

The method may include refining the estimated dimension responsively to the depth maps in the sequence while tracking the movements.

There is also provided, in accordance with an embodiment of the present invention, apparatus for processing data, including an imaging assembly, which is configured to capture a temporal sequence of depth maps of a scene containing a humanoid form having a head, the depth maps including a matrix of pixels having respective pixel depth values. A processor is configured to process at least one of the depth maps so as to find a location of the head, to estimate dimensions of the humanoid form based on the location, and to track movements of the humanoid form over the sequence using the estimated dimensions.

There is additionally provided, in accordance with an embodiment of the present invention, a computer software product, including a computer-readable medium in which program instructions are stored, which instructions, when read by a computer, cause the computer to receive a temporal sequence of depth maps of a scene containing a humanoid form having a head, the depth maps including a matrix of pixels having respective pixel depth values, to process at least one of the depth maps so as to find a location of the head, to estimate dimensions of the humanoid form based on the location, and to track movements of the humanoid form over the sequence using the estimated dimensions.

The present invention will be more fully understood from the following detailed description of the embodiments thereof, taken together with the drawings in which:

DETAILED DESCRIPTION OF EMBODIMENTS

Overview

Depth maps provide a wealth of information, particularly when they are presented in a continuous stream over time. Games and other applications based on depth maps, however, have developed only slowly due to the difficulties inherent in capturing, processing, and extracting high-level information from such maps. Finding and tracking the parts of a moving humanoid form in a sequence of depth maps is a particular challenge.

Embodiments of the present invention that are described hereinbelow provide robust, efficient methods, systems and software for extracting humanoid forms from depth maps. These methods are directed particularly at reconstructing a "skeleton" of a 3D form that is believed to correspond to a humanoid body, i.e., a schematic model that includes the torso, head and limbs and indicates their respective locations and orientations. The parameters and motion of such a skeleton can serve as a simplified input to application programs, enabling such programs to respond to users' gestures and posture.

In the embodiments disclosed below, a processor receives a temporal sequence of depth maps of a scene containing a humanoid form. The processor finds the location of the head of the humanoid form in at least one of the depth maps, and estimates the dimensions of the humanoid form based on the head location. The processor uses the head location and estimated dimensions in reconstructing the skeleton and thus tracking movements of the humanoid form over the sequence of depth maps.

A number of different techniques may be used to find the head location initially. In some embodiments, the processor segments and analyzes a 3D form to identify right and left arms, and then searches the space between the arms in order to find the head. This task can be facilitated by instructing the user (whose body corresponds to the 3D form in the depth maps) to assume a suitable calibration pose, typically a pose in which the hands are raised to both sides of the head.

In an alternative embodiment, the depth maps are registered with 2D images (such as color images) of the same scene. The processor may apply a face recognition technique to identify the face of a humanoid form in a 2D image. The face location in the 2D image indicates the location of the head of the 3D form.

System Description

Figure 1:
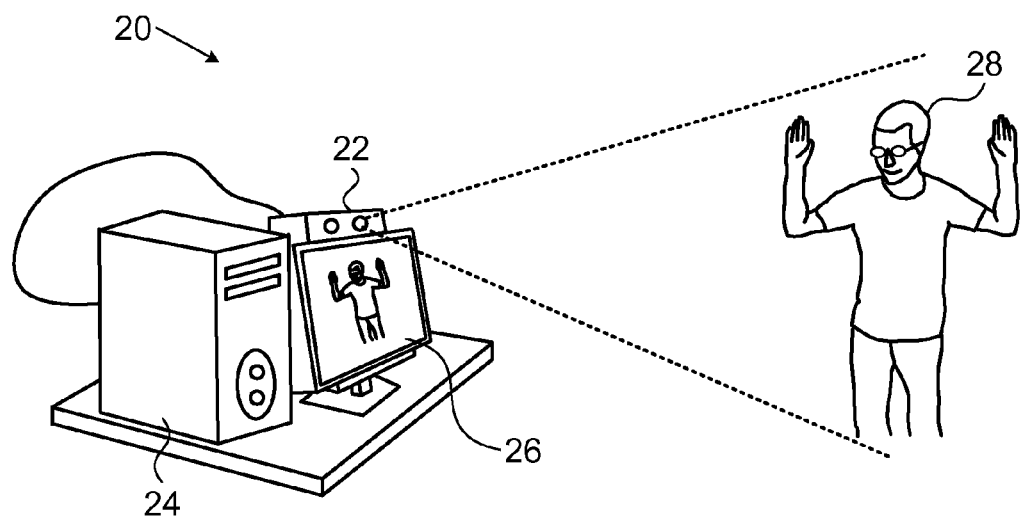
FIG. 1 is a schematic, pictorial illustration of a system for 3D mapping and tracking of humanoid forms, in accordance with an embodiment of the present invention.

FIG. 1 is a schematic, pictorial illustration of a 3D user interface system 20, in accordance with an embodiment of the present invention. The user interface is based on a 3D imaging assembly 22, which captures 3D scene information that includes at least a part of the body of a human user 28. Assembly 22 may also capture 2D color video images of the scene. Details of a 3D imaging assembly of this sort are described, for example, in PCT International Publication WO 2010/004542, whose disclosure is incorporated herein by reference.

Assembly 22 outputs a sequence of frames containing 3D map data (and possibly color image data, as well) to a computer 24, which extracts high-level information from the map data. This high-level information is provided via an Application Program Interface (API) to an application running on computer 24, which drives a display screen 26 accordingly. For example, user 28 may interact with game software running on computer 24 by moving his limbs and changing his body posture.

In one embodiment, assembly 22 projects a pattern of spots onto the scene and captures an image of the projected pattern. Assembly 22 or computer 24 then computes the 3D coordinates of points in the scene (including points on the surface of the user's body) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from assembly 22. Methods and devices for this sort of triangulation-based 3D mapping using a projected pattern are described, for example, in PCT International Publications WO 2007/043036, WO 2007/105205 and WO 2008/120217, whose disclosures are incorporated herein by reference, as well as in the above-mentioned WO 2010/004542.

Alternatively, system 20 may use other methods of 3D mapping, such as stereoscopic imaging or time-of-flight measurements, based on single or multiple cameras or other types of sensors, as are known in the art.

In the embodiment shown in FIG. 1, system 20 captures and processes a temporal sequence of depth maps (also referred to as 3D maps) containing user 28, while the user moves his body. Software running on a processor in assembly 22 and/or computer 24 processes the 3D map data to extract geometrical features of the humanoid forms corresponding to the users in the scene. The software analyzes these geometrical features (as described in detail hereinbelow) in order to extract a skeleton of each form, including 3D locations and orientations of the users' hands and joints. It may also analyze the trajectory of the hands over multiple frames in the sequence in order to identify gestures delineated by the hands. The skeleton and gesture information are provided via the above-mentioned API to an application program running on computer 24. This program may, for example, move and modify images presented on display 26 in response to the skeleton and/or gesture information.

Computer 24 typically comprises a general-purpose computer processor, which is programmed in software to carry out the functions described hereinbelow. The software may be downloaded to the processor in electronic form, over a network, for example, or it may alternatively be provided on tangible, non-transitory media, such as optical, magnetic, or electronic memory media. Alternatively or additionally, some or all of the described functions of the computer may be implemented in dedicated hardware, such as a custom or semi-custom integrated circuit or a programmable digital signal processor (DSP). Although computer 24 is shown in FIG. 1, by way of example, as a separate unit from imaging assembly 22, some or all of the processing functions of the computer may be performed by a suitable microprocessor and software or by dedicated circuitry within the housing of the imaging assembly or otherwise associated with the imaging assembly.

As another alternative, at least some of these processing functions may be carried out by a suitable processor that is integrated with display screen 26 (in a television set, for example) or with any other suitable sort of computerized device, such as a game console or media player. The sensing functions of assembly 22 may likewise be integrated into the computer or other computerized apparatus that is to be controlled by the sensor output.

Figure 2:
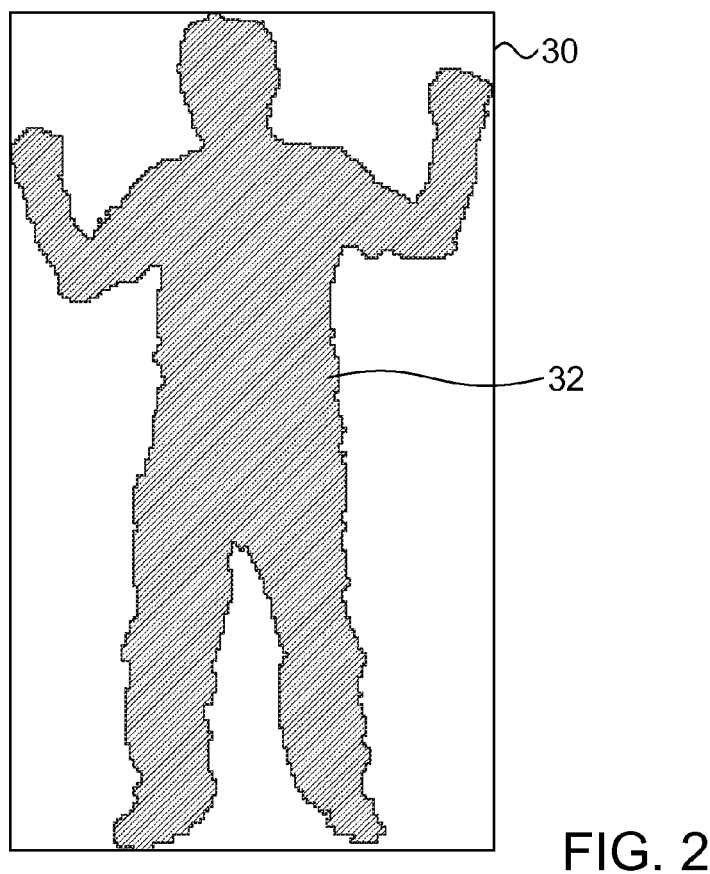
FIG. 2 is a schematic representation of a depth map, in accordance with an embodiment of the present invention.

FIG. 2 is a schematic representation of a depth map captured by assembly 22, in accordance with an embodiment of the present invention. The depth map, as explained above, comprises a matrix of pixels having respective depth values. Computer 24 processes these depth values in order to identify and segment a component of the image (i.e., a group of neighboring pixels) having characteristics of a humanoid form (such as overall size, shape and motion from frame to frame of the sequence of depth maps). Methods for identification and segmentation of such forms in sequences of depth maps are described, for example, in U.S. patent application Ser. No. 12/854,187, entitled "Analysis of Three-Dimensional Scenes" (attorney docket number 1020-1045.1), which is assigned to the assignee of the present patent application and whose disclosure is incorporated herein by reference. In map 30, the humanoid form is standing in a calibration pose, in which the left and right arms are raised, as explained further hereinbelow.

Methods for Skeleton Extraction

Figure 3:
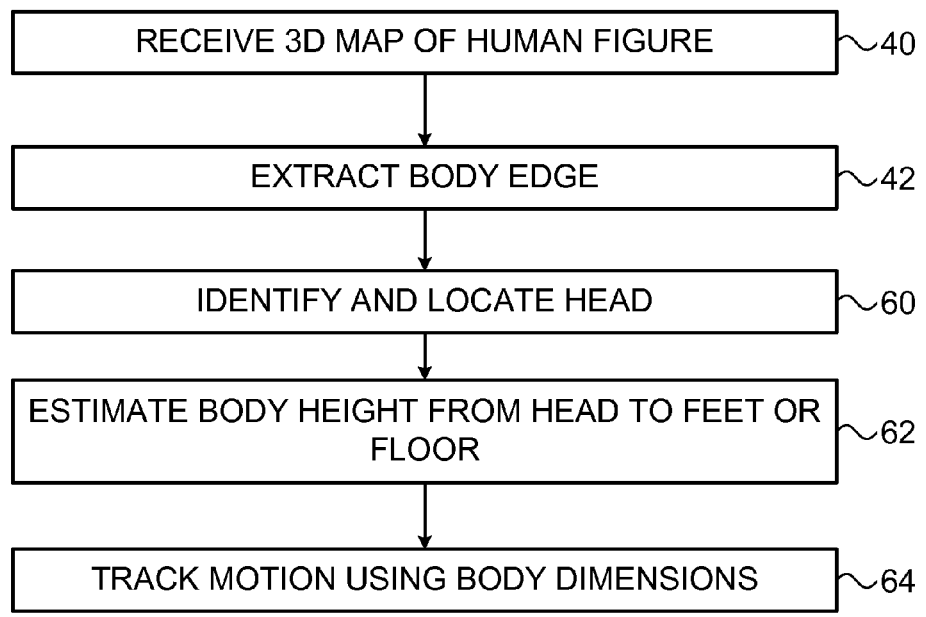
FIG. 3 is a flow chart that schematically illustrates a method for extracting and tracking features of humanoid forms in a depth map, in accordance with an embodiment of the present invention.

FIG. 3 is a flow chart that schematically illustrates a method for extracting and tracking features of a humanoid form in a sequence of depth maps, in accordance with an embodiment of the present invention. Computer 24 applies this method upon receiving a depth map, at a map input step 40. The map is assumed to have been segmented so as to identify one or more 3D connected components that may be humanoid forms, as shown in FIG. 2, for example. Computer 24 processes the depth map in order to find the edge of the connected component, at an edge extraction 42. Various methods that are known in the art may be used for this purpose. For example, the computer may take a derivative of the depth map and then connect together neighboring pixels having similar derivative values until a complete edge has been defined. The above-mentioned WO 2007/132451 also describes methods that may be used in this context.

Figure 4:
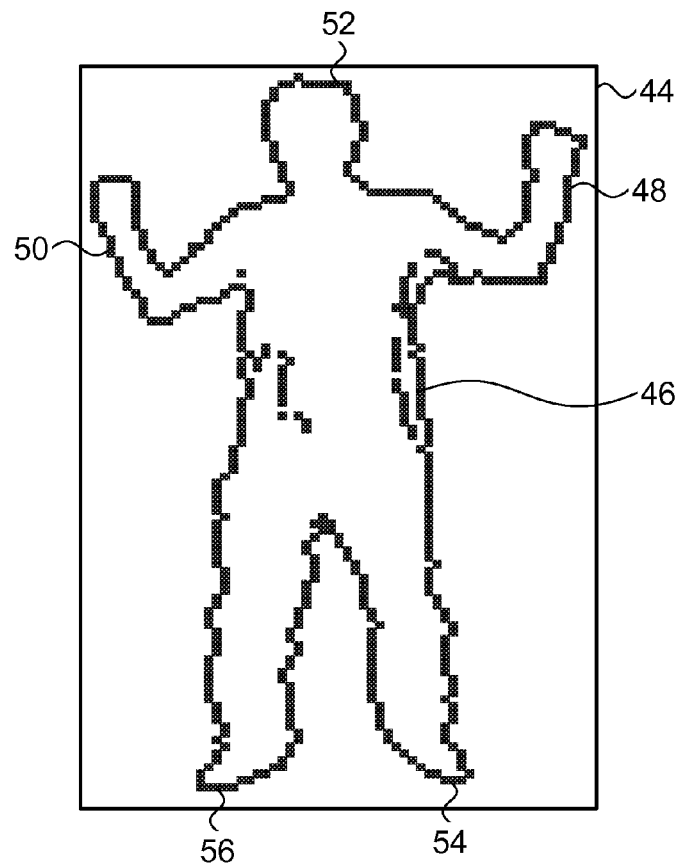
FIG. 4 is a schematic representation of the edge of a humanoid form extracted from a depth map, in accordance with an embodiment of the present invention.

FIG. 4 is a schematic representation of a processed depth map 44, showing an extracted edge 46 of the humanoid form of FIG. 2, in accordance with an embodiment of the present invention. Because the human subject is standing in the calibration pose, computer 24 can clearly identify the body extremities, including arms 48 and 50, head 52, and feet 54. One method that can be used for this purpose is described hereinbelow with reference to FIGS. 5 and 6. Although FIG. 4 (and similarly FIGS. 2 and 6) is shown as a two-dimensional image due to the limitations of the printed page, edge 46 is actually a 3D form, and operations on this edge, as described below, are performed in three dimensions.

Figure 5:
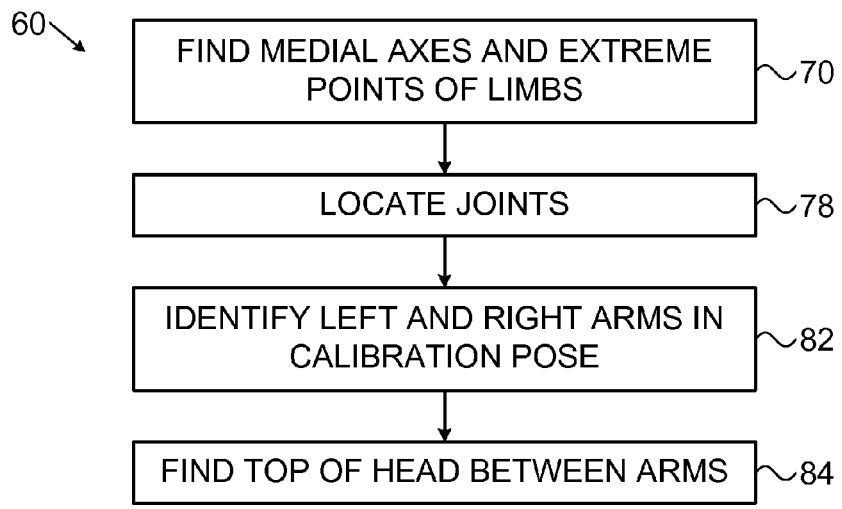
FIG. 5 is a flow chart that schematically illustrates a method for finding features of a humanoid form in a depth map, in accordance with an embodiment of the present invention.

Returning to FIG. 3, computer 24 processes the extracted body edge in order to identify head 52, at a head location step 60. One challenge in this step is to differentiate the head from other body extremities, notwithstanding differences in height, head size (including hair) and other body dimensions among users of system 20. Because of these factors, as well as variations in pose, lighting, and clutter in the area of the user's body, the input to step 60 is often not as clear as the exemplary map shown in FIG. 4. One method that may be used to overcome the difficulties of head location and skeleton extraction is shown in FIG. 5.

Another method that may be used at step 60 is based on locating the face of the humanoid form. A number of methods have been developed for locating and identifying facial features in digital images. Image processing software that may be used for this purpose is available, for example, in the FaceSDK package, available from Luxand Inc. (Alexandria, Va.), as well as in the OpenCV computer vision library available from Intel Corp. (Santa Clara, Calif.). Assuming that assembly 22 outputs 2D images in registration with the depth maps (as described in the above-mentioned WO 2010/004542), the face recognition software may operate on a 2D image to identify and find the coordinates of a face within a humanoid form that was received at step 40. Computer 24 may then use these coordinates at step 60 in locating the head that is within the body edge.

Computer 24 uses the head location found at step 60 in estimating the body height of the humanoid form, at a height estimation step 62. Needless to say, height varies substantially among computer users, from small children to tall adults. Other body dimensions (such as lengths of limbs) tend to scale with the height. Therefore, for reliable skeleton extraction and tracking of user movement, it is helpful to have an accurate estimate of the height. In cases in which feet 54 and 56 can be identified, such as that shown in FIG. 4, the height can be estimated by taking the distance from head 52 to the feet.

On the other hand, it commonly occurs that the feet of the humanoid subject are obscured by other objects in the scene or are outside the frame of the depth map entirely. In such cases, rather than locating the feet, computer 24 may locate the floor in the scene. The floor can be identified as a planar, generally horizontal surface (depending on the orientation of assembly 22) in the lower portion of the depth map. A detailed method for locating the floor in a depth map is presented, for example, in the above-mentioned U.S. patent application Ser. No. 12/854,187. Once the floor plane has been found, the height of the humanoid form is given by the distance from the head to this plane.

Computer 24 uses the body height in estimating the remaining body dimensions for purposes of pose extraction and motion tracking, at a tracking step 64. The relevant dimensions (such as lengths of arms, legs and torso) may be derived from the height using anthropometric standards for average body build. The computer may additionally process the depth map to locate the shoulders and/or other features of the skeleton, which give an indication of the body proportions (height/width), and may use these proportions in more accurately estimating the remaining body dimensions. (In difficult conditions, in which the head cannot be clearly identified, the body height, as well as width, may be estimated on the basis of the shoulders alone.) The estimated body dimensions may be combined with actual measurements of arm and leg dimensions (length and thickness) made on the depth map for still more accurate modeling.

The result of step 64 is a skeleton with well-defined dimensions. The skeleton includes torso, head, arms and legs, with joints, extreme points, and body part dimensions identified. The accurate, known dimensions of the skeleton facilitate reliable, robust tracking of motion of human subjects, even when the subjects turn their bodies and assume postures in which parts of their bodies are obscured from assembly 22. Computer 24 can model the motion of a human subject in terms of rotation and translation of the joints and extreme points of the skeleton. This information can be provided to application programs via an API, as described, for example, in U.S. Provisional Patent Application 61/349,894, filed May 31, 2010, which is assigned to the assignee of the present patent application and whose disclosure is incorporated herein by reference.

The process of estimating skeleton dimensions that is described above may continue as the user interacts with the computer, with gradual refinement and improvement of the estimates. For this purpose, computer 24 may gather further information from the depth maps in the ongoing sequence, including maps of different poses in which certain parts of the body may be mapped more accurately. The computer combines this information over multiple frames in order to generate a more accurate set of measurements of the body parts and thus improve the skeleton model.

Figure 6:
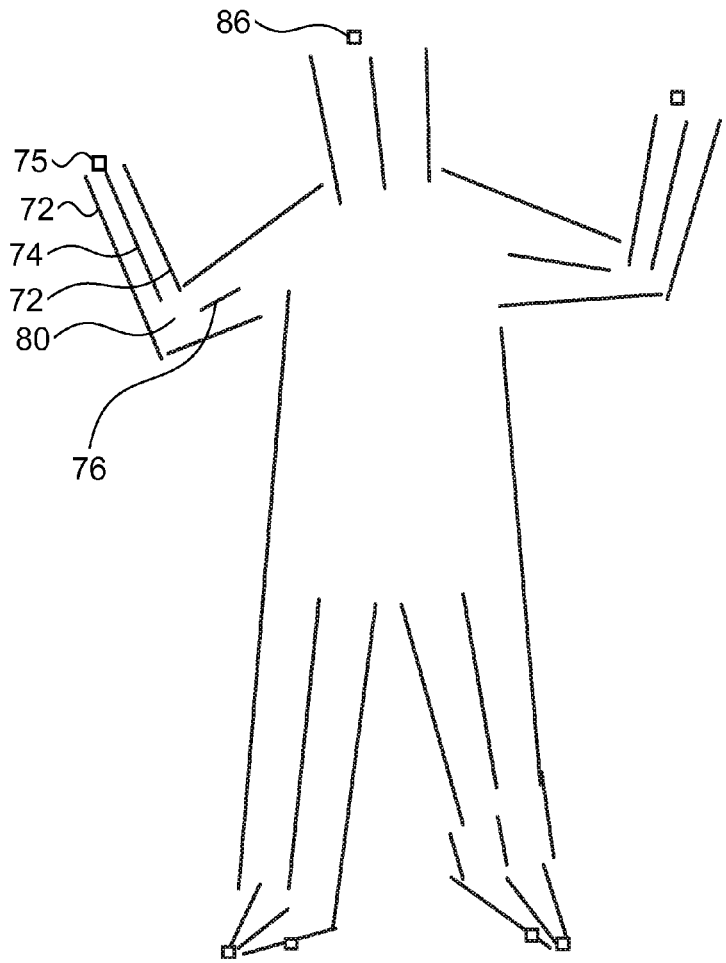
FIG. 6 is a schematic representation of features of a humanoid form that have been extracted from a depth map, in accordance with an embodiment of the present invention.

Reference is now made to FIGS. 5 and 6, which schematically show details of a method that may be used at step 60 (FIG. 3) to find the location of the head and other features of a humanoid form in a depth map, in accordance with an embodiment of the present invention. FIG. 5 is a flow chart, while FIG. 6 is a schematic representation of features of a humanoid form that have been extracted from the depth map illustrated in FIGS. 2 and 4.

Computer 24 processes edge 46 in order to find the medial axes and extreme points of the limbs of the humanoid form, at a limb analysis step 70. Various different techniques may be used for this purpose. In the example illustrated in FIG. 6, computer 24 identifies the body parts by fitting straight lines to the edges shown in FIG. 4. The edge points may be grouped for fitting in such a way that the lines that are fitted to neighboring groups of edge points meet at sharp angles, as shown in FIG. 6. The computer then groups these straight lines in matching pairs of approximately parallel lines, such as lines 72. In this case, the computer will identify lines 72 as defining the right forearm, on the basis of their length, separation, and location relative to the rest of the body. The other parts of the limbs are identified in a similar manner.

For each such pair of lines, computer 24 identifies a medial axis 74, 76, along with an extreme point 75 as appropriate. As noted earlier, the medial axes and extreme points are represented in 3D coordinates. The computer finds the approximate intersection points of the medial axes in order to identify body joints, at a joint location step 78. (The medial axes may not precisely intersect in 3D space.) Thus, the computer locates a joint 80 (in this case, the right elbow) of the subject as the intersection between axes 74 and 76 of the forearm and upper arm, respectively.

To extract the skeleton, computer 24 identifies the limbs that correspond to the subject's left and right arms, at an arm identification step 82. The computer selects arm candidates from among the pairs of parallel lines that were found at step 70. The choice of candidates is based on identification of the lower arms (defined by edges 72 and axis 74), together with the corresponding elbow locations and possibly other factors, such as the straight lines corresponding to the outer part of the upper arms. The computer seeks a pair of arm candidates on opposite sides of the humanoid form, with similar proportions and at a similar height. If the subject is standing in the calibration pose, as illustrated in the foregoing figures, then the search for the arm candidates may be limited to limbs whose medial axes fall within a certain predefined angular range. For example, the upper arm directions may be restricted to fall within the range between $-60°$ and $+20°$ of the horizontal.

After identifying the arms, computer 24 calculates the shoulder location for each arm in the calibration pose, based on the respective location of elbow 80, the direction of upper arm axis 76, and the estimated upper arm length. The computer then calculates the shoulder width by taking the distance between the shoulder locations. (The computer may also estimate the widths of the limbs, such as the respective widths of the upper and lower arms.) The computer searches the space above and between the shoulders in order to find the head of the humanoid form, at a head finding step 84. The computer may find a top point 86 of the head, for example, by searching for the highest point on edge 46 in the region of the depth map that is between the forearms and above the elbows.

As explained earlier, computer 24 uses the location of top point 86 at step 62 (FIG. 3) in finding the body height. The computer then applies this height, possibly together with the distance between the shoulders, is estimating the body dimensions and tracking motion of the body at step 64.

The dimensions of the humanoid form may be used immediately in tracking the movements of the body of a user or, alternatively or additionally, they may be stored and applied subsequently without necessarily repeating the procedure. For example, computer 24 may store dimensions associated with a given user name and then recall those dimensions when that user logs in. For this reason, the sequence of depth maps over which embodiments of the present invention are applied is not necessarily a continuous sequence. Rather, the term "sequence of depth maps," as used in the context of the present patent application and in the claims, should be understood as referring to any succession of depth maps, whether continuous or broken into two or more separate sub-sequences, in which a particular humanoid form appears.

Although embodiments of the present invention are described above, for the sake of clarity, in the context of the particular components of system 20, the principles of the present invention may similarly be applied in conjunction with substantially any other type of depth mapping system. Furthermore, although the described embodiments are implemented using certain specific image processing algorithms, the principles of these embodiments may likewise be implemented using other image processing techniques, as are known in the art. All such alternative implementations are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing data, comprising:
receiving a temporal sequence of depth maps of a scene containing a humanoid form, the depth maps comprising a matrix of pixels having respective pixel depth values;
using a digital processor, processing at least one of the depth maps so as to find respective three-dimensional (3D) medial axes of segments of limbs of the humanoid form in a 3D space;

identifying joints in the limbs by finding approximate intersection points of the 3D medial axes of adjoining segments of the limbs, wherein for at least some of the adjoining limb segments, the respective 3D medial axes do not precisely intersect in the 3D space; and tracking movements of the humanoid form over the sequence using the medial axes and the joints of the limbs.

2. The method according to claim 1, wherein finding the approximate intersection points comprises locating an elbow at an approximate intersection of the 3D medial axes of an upper arm and a forearm of the humanoid form.

3. The method according to claim 1, wherein processing the at least one of the depth maps comprises identifying, using the identified joints and limbs, left and right arms of the humanoid form, and searching to find a head of the humanoid form between the arms.

4. The method according to claim 3, wherein identifying the left and right arms comprises capturing the at least of the depth maps while the humanoid form stands in a calibration pose, in which the left and right arms are raised.

5. The method according to claim 4, wherein the left and right arms are raised above a shoulder level of the humanoid form in the calibration pose.

6. The method according to claim 1, wherein processing the at least one of the depth maps comprises extracting edges of the humanoid form from the at least one depth map, and finding the 3D medial axes and extreme points of limbs of the humanoid form based on the edges.

7. The method according to claim 6, wherein finding the 3D medial axes comprises:

fitting straight lines in the 3D space to the extracted edges;
defining the segments of the limbs by matching pairs of the straight lines that are approximately parallel; and
identifying a respective 3D medial axis between each of the matched pairs.

8. The method according to claim 1, wherein identifying the joints comprises locating left and right shoulders of the humanoid form, and wherein the method comprises computing a width between the shoulders, and estimating dimensions of other parts of the humanoid form based on the width.

9. The method according to claim 8, and comprising refining the estimated dimensions responsively to the depth maps in the sequence while tracking the movements.

10. Apparatus for processing data, comprising:

an imaging assembly, which is configured to capture a temporal sequence of depth maps of a scene containing a humanoid form, the depth maps comprising a matrix of pixels having respective pixel depth values; and a digital processor, which is configured to process at least one of the depth maps so as to find respective three-dimensional (3D) medial axes of segments of limbs of the humanoid form in a 3D space, to identify joints in the limbs by finding approximate intersection points of the 3D medial axes of adjoining segments of the limbs, wherein for at least some of the adjoining limb segments, the respective 3D medial axes do not precisely intersect in the 3D space, and to track movements of the humanoid form over the sequence using the medial axes and the joints of the limbs.

11. The apparatus according to claim claim 10, wherein the digital processor is configured to locate an elbow at an approximate intersection of the 3D medial axes of an upper arm and a forearm of the humanoid form.

12. The apparatus according to claim 10, wherein the digital processor is configured to identify, using the identified joints and limbs, left and right arms of the humanoid form, and to search to find a head of the humanoid form between the arms.

13. The apparatus according to claim 10, wherein the digital processor is configured to extract edges of the humanoid form from the at least one depth map, and to find the 3D medial axes and extreme points of limbs of the humanoid form based on the edges.

14. The apparatus according to claim 13, wherein the digital processor is configured to find the 3D medial axes by fitting straight lines in the 3D space to the extracted edges, defining the segments of the limbs by matching pairs of the straight lines that are approximately parallel, and identifying a respective 3D medial axis between each of the matched pairs.

15. The apparatus according to claim 10, wherein the identified joints comprise left and right shoulders of the humanoid form, and wherein the digital processor is configured to compute a width between the shoulders, and to estimate dimensions of other parts of the humanoid form based on the width.

16. A computer software product, comprising a non-transitory computer-readable medium in which program instructions are stored, which instructions, when read by a computer, cause the computer to receive a temporal sequence of depth maps of a scene containing a humanoid form, the depth maps comprising a matrix of pixels having respective pixel depth values, to process at least one of the depth maps so as to find respective three-dimensional (3D) medial axes of segments of limbs of the humanoid form in a 3D space, to identify joints in the limbs by finding approximate intersection points of the 3D medial axes of adjoining segments of the limbs, wherein for at least some of the adjoining limb segments, the respective 3D medial axes do not precisely intersect in the 3D space, and to track movements of the humanoid form over the sequence using the medial axes and the joints of the limbs.

17. The product according to claim 16, wherein the instructions cause the computer to identify, using the identified joints and limbs, left and right arms of the humanoid form, and to search to find a head of the humanoid form between the arms.

18. The product according to claim 16, wherein the instructions cause the computer to extract edges of the humanoid form from the at least one depth map, and to find the 3D medial axes and extreme points of limbs of the humanoid form based on the edges.

19. The product according to claim 16, wherein the identified joints comprise left and right shoulders of the humanoid form, and wherein the instructions cause the computer to compute a width between the shoulders, and to estimate dimensions of other parts of the humanoid form based on the width.

20. The product according to claim 18, wherein the instructions cause the computer to find the 3D medial axes by fitting straight lines in the 3D space to the extracted edges, defining the segments of the limbs by matching pairs of the straight lines that are approximately parallel, and identifying a respective 3D medial axis between each of the matched pairs.

* * * * *